United States Patent
Fischle et al.

(10) Patent No.: US 7,228,944 B2
(45) Date of Patent: Jun. 12, 2007

(54) METHOD FOR DETERMINING THE TEMPERATURE OF A WHEEL-BRAKING DEVICE OF A BRAKE SYSTEM

(75) Inventors: Gerhard Fischle, Esslingen (DE); Alexander Hohnwald, Asperg (DE); Taner Kandemir, Stuttgart (DE); Thorsten Klepser, Kirchheim (DE); Frank Tietze, Stuttgart (DE); Peter Woll, Bruchsal (DE)

(73) Assignee: DaimlerChrysler AG, Stuttgart (DE)

( * ) Notice: Subject to any disclaimer, the term of this patent is extended or adjusted under 35 U.S.C. 154(b) by 360 days.

(21) Appl. No.: 10/269,089

(22) Filed: Oct. 11, 2002

(65) Prior Publication Data

US 2003/0079945 A1 May 1, 2003

(30) Foreign Application Priority Data

Oct. 12, 2001 (DE) .................... 101 50 276

(51) Int. Cl.
*F16D 66/00* (2006.01)
(52) U.S. Cl. ................. 188/1.11 R; 188/1.11 E; 303/191

(58) Field of Classification Search ........... 188/1.11 R, 188/1.11 E, 71.6, 79.52, 264 R; 303/191
See application file for complete search history.

(56) References Cited

U.S. PATENT DOCUMENTS

| | | | |
|---|---|---|---|
| 5,136,508 A | 8/1992 | Bannon et al. | 364/426.01 |
| 5,524,974 A | 6/1996 | Fischle et al. | 303/191 |

FOREIGN PATENT DOCUMENTS

| | | |
|---|---|---|
| DE | 42 35 364 | 4/1994 |
| DE | 44 18 768 C2 | 12/1995 |
| EP | 0 594 113 | 10/1992 |

OTHER PUBLICATIONS

German Office Action dated Sep. 18, 2006, with English translation (Six (6) pages).

*Primary Examiner*—James McClellan
*Assistant Examiner*—Mariano Sy
(74) *Attorney, Agent, or Firm*—Crowell & Moring LLP

(57) ABSTRACT

In a method for determining the temperature of a wheel-braking device of a brake system, the current disc temperature of the brake disc is determined based on the last-determined disc temperature, the energy supplied to the brake disc since the last temperature determination, and the energy discharged by the brake disc since the last temperature determination. The current caliper temperature of the brake caliper of the wheel-braking device is determined by means of the current disc temperature of the brake disc.

14 Claims, 3 Drawing Sheets

METHOD FOR DETERMINING THE TEMPERATURE OF A WHEEL-BRAKING DEVICE OF A BRAKE SYSTEM

BACKGROUND AND SUMMARY OF THE INVENTION

This application claims the priority of German patent document 101 50 276.1, filed 12 Oct. 2001, the disclosure of which is expressly incorporated by reference herein.

The invention relates to a method for determining the temperature of a wheel-braking device in a brake system, particularly an electrohydraulic, electropneumatic or an electromechanical brake system.

In brake systems of this type, at least in the normal operating state, there is no mechanical or hydraulic connection between the brake-operating element and the wheel-braking devices. Moreover, braking action may be restricted due to an increased operating temperature in the region of the brake discs or, where an electrohydraulic brake system is concerned, in the hydraulic fluid. In vehicle brake systems with a fluidic or mechanical connection between the brake-operating element (for example, the brake pedal) and the wheel-braking devices, the driver receives feedback on the decrease in the braking action by observing a change in the actuation necessary to produce the same braking action (for example, the brake-pedal travel becomes longer). However, such feedback is no longer available in recent brake systems, since the brake-operating element is uncoupled mechanically or fluidically from the wheel-braking devices of the vehicle.

It is known from German patent document DE 42 35 364 A1 to determine the current disc temperature from the heat supplied to the brake disc during braking and, if there is no braking operation, from the heat discharged from the brake disc. When the disc temperature exceeds a limit value, a warning to the driver is generated.

One object of the present invention is to provide an improved method for determining the temperature of the wheel-braking device.

This and other objects and advantages are achieved by the method according to the invention, in which the current disc temperature of the brake disc is determined based on the last-determined disc temperature, the energy supplied to the brake disc since the last temperature determination, and the energy discharged by the brake disc since the last temperature determination. The current caliper temperature of the brake caliper of the wheel-braking device is determined by means of the current disc temperature of the brake disc.

Particularly with regard to hydraulically actuated brake jaws, the caliper temperature is, as a rule, more critical than the disc temperature, since the brake caliper heats the fluid actuating the brake jaws to a substantially greater extent than the brake disc and a decreasing braking action can consequently occur.

Other objects, advantages and novel features of the present invention will become apparent from the following detailed description of the invention when considered in conjunction with the accompanying drawings.

BRIEF DESCRIPTION OF THE DRAWINGS

FIG. 3 shows the flow chart for determining the disc switch-on temperature of the brake disc and the caliper switch-on temperature of the brake caliper when the ignition of the vehicle is switched on.

DETAILED DESCRIPTION OF THE DRAWINGS

Figure 2:
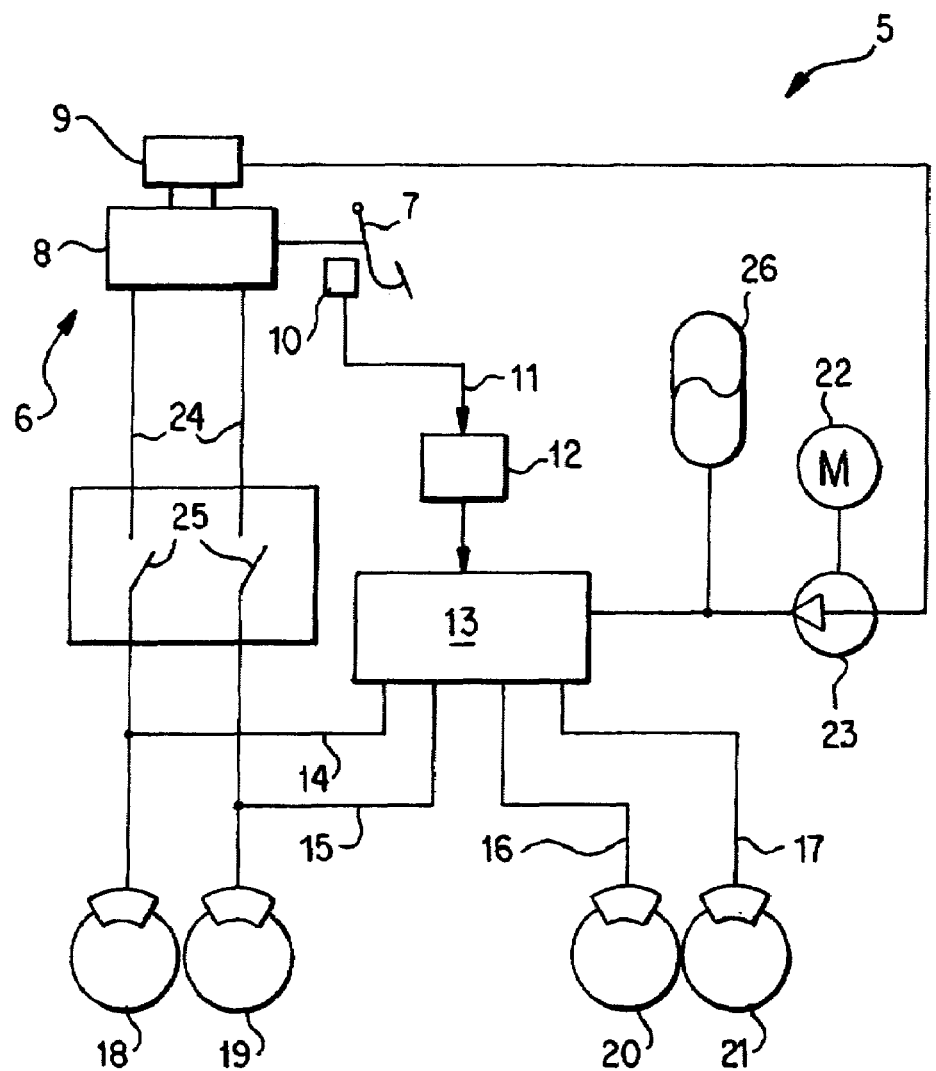
FIG. 2 shows a diagrammatic illustration of an electrohydraulic brake system in the manner of a circuit diagram.

FIG. 2 shows a representative embodiment of an electrohydraulic brake system 5, including an actuating device 6 which possesses a brake pedal 7, a brake master cylinder 8 connected to the brake pedal, a reservoir 9 supplying the brake master cylinder 8 with brake fluid and a sensor 10 detecting the brake-pedal position. The sensor 10 transmits a signal corresponding to the brake-pedal position, via an electrical line 11, to a control unit 12 which controls a hydraulic assembly 13 of the electrohydraulic brake system.

Pressurized brake fluid is supplied to the hydraulic assembly 13 from a pressure accumulator 26. The hydraulic assembly 13 can supply the brake pressure via brake lines 14, 15, 16, 17 to the respectively assigned wheel-braking devices 18, 19, 20, 21 individually with respect to the wheels.

The pressure accumulator 26 is filled via a pump 23 which is driven by a motor 22 and which sucks up the brake fluid from the reservoir 9.

The wheel-braking devices 18, 19 of the front axle of the vehicle are connected to the brake master cylinder 8 in each case via an emergency brake line 24, an isolating valve 25 being located in each of the emergency brake lines 24. In the event of a failure of the electrical part of the electrohydraulic brake system 5, the two isolating valves 25 can be closed and connect the wheel-braking devices 18, 19 of the front axle directly to the brake master cylinder 8. During normal operation (that is, when the electrohydraulic brake system 5 is functioning properly, the two isolating valves 25 are open.

It is now explained below how the temperature of the wheel-braking devices 18, 19, 20, 21 is determined.

The current disc temperature $T_{disc,\,current}$ is determined by reference to the last-determined disc temperature $T_{disc,\,old}$, the energy $E_{friction,\,disc}$ supplied to the brake disc since the last temperature determination, and the energy $E_{disc,\,disc}$ discharged by the brake disc since the last temperature determination. (See FIG. 1.) Both the energy supplied to the brake disc and the energy discharged from the brake disc are continually calculated on a cyclical basis. The cycles times for determining the energy supplied to the brake disc and the energy discharged from the brake disc may be different. For example, the energy $E_{friction,\,disc}$ supplied to the brake disc is calculated substantially more frequently than the energy $E_{disc,\,dis}$ discharged by the brake disc.

During a braking operation, heat is supplied to the brake disc due to frictional work. The energy $E_{friction,\,disc}$ thereby supplied to the brake disc can be calculated as follows:

$$E_{friction,\,disc} = p \cdot v_{wheel} \cdot k_{disc,\,1},$$

with $k_{disc,\,1} = f(p)$

The factor $k_{disc,\,1}$ is a first factor which, in the preferred exemplary embodiment, depends on the brake pressure set at the wheel-braking device 18, 19, 20 or 21. In a modified embodiment, this first factor $k_{disc,\,1}$ could also depend on the last-determined disc temperature $T_{disc,\,old}$ and/or on the last-determined caliper temperature $T_{caliper,\,old}$. The quantity p represents the brake pressure set at the wheel-braking device 18, 19, 20 or 21, and $V_{wheel}$ is the wheel speed of the vehicle wheel assigned to the wheel-braking device 18, 19, 20 or 21. Thus, in the exemplary embodiment, the energy $E_{friction, disc}$ supplied to the brake disc is determined for each wheel-braking device individually with respect to the wheels. Alternatively, instead of the wheel speed $v_{wheel}$, the vehicle speed $v_{veh}$ could also be used here, since this is sufficient for the accuracy, necessary here, in determining the disc temperature.

However, the brake disc at any moment also discharges energy in the form of heat. In the exemplary embodiment, only the energy discharged by convection is taken into account in determining the energy $E_{disc, dis}$ discharged by the brake disc. (The energy discharge due to heat radiation of the brake disc is ignored, primarily because the discharge of heat from the brake disc to the brake caliper due to heat radiation is negligible, as compared with the heat discharge from the brake disc to the brake caliper due to convection.)

Figure 1:
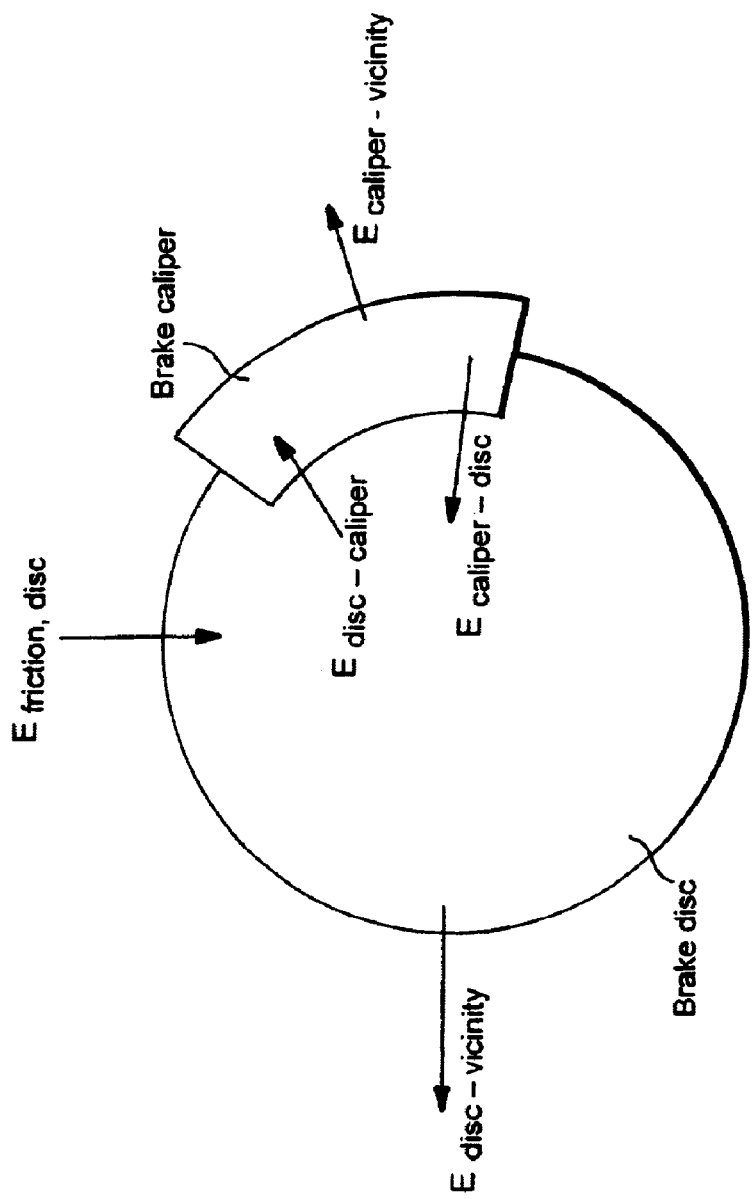
FIG. 1 shows diagrammatically a wheel-braking device and the energy transfers essential for determining the temperature.

The energy $E_{disc, dis}$ discharged by the brake disc is composed of the energy $E_{disc-vicinity}$ discharged by the brake disc to the surrounding vicinity, and the energy $E_{disc-caliper}$ discharged from the brake disc to the brake caliper (FIG. 1). The energy discharged to the vicinity by the brake disc is calculated as follows:

$$E_{disc-vicinity} = T_{disc, old} \cdot k_{disc, 2},$$

with $k_{disc, 2} = f(v_{veh})$ $T_{disc, old}$ is in this case the last-determined disc temperature and $k_{disc, 2}$ is a second factor which is dependent on the vehicle speed $v_{veh}$. The second factor $k_{disc, 2}$ is dependent on the vehicle speed $v_{veh}$ and not on the wheel speed $V_{wheel}$, since a locking wheel (wheel speed $v_{wheel} = $ zero) is ventilated as a function of the vehicle speed $v_{veh}$ and is correspondingly cooled. For this cooling, therefore, it is not the wheel speed of an individual wheel which is critical, but the vehicle speed.

Both the first factor $k_{disc, 1}$ and the second factor $k_{disc, 2}$ are determined empirically, for example by tests, and depend on the design of the brake system and of the vehicle. They therefore differ from one another in each vehicle type and in each type of brake system.

If the last-determined disc temperature $T_{disc, old}$ is higher than the last-determined caliper temperature of the brake caliper $T_{caliper, old}$, the brake disc discharges energy to the brake caliper. The energy discharged from the brake disc to the brake caliper is then determined as follows:

$$E_{disc-caliper} = (T_{disc, old} - T_{caliper, old}) \cdot k_{caliper, 1},$$

if $T_{disc, old} > T_{caliper, old}$.

$k_{caliper, 1}$ is in this case a third factor which is likewise determined empirically or experimentally as a function of the designs of the vehicle or of the brake system.

The energy $E_{disc-caliper}$ udischarged from the brake disc to the brake caliper is used to determine not only the current disc temperature $T_{disc, current}$, but also the current caliper temperature $T_{caliper, current}$.

If the last-determined disc temperature $T_{disc, old}$ is lower than the last-determined caliper temperature $T_{caliper, old}$, energy $E_{caliper-disc}$ is supplied to the brake disc from the brake caliper. The energy $E_{disc-caliper}$ udischarged from the brake disc to the brake caliper is then zero. The energy $E_{caliper-disc}$ discharged from the brake caliper to the brake disc can be determined as follows:

$$E_{caliper-disc} = (T_{caliper, old} - T_{disc, old}) \cdot k_{caliper, 2},$$

if $T_{caliper, old} > T_{disc, old}$.

$k_{caliper, 2}$ is in this case a fourth factor which is determined empirically or experimentally in a similar way to the other factors. The brake caliper discharges energy to the brake disc only when the last-determined caliper temperature $T_{caliper, old}$ is higher than the last-determined disc temperature $T_{disc, old}$. If this is not so, the energy $E_{caliper-disc}$ discharged from the brake caliper to the brake disc is equal to zero.

It may be pointed out that the third factor $k_{caliper, 1}$ and the fourth factor $k_{caliper, 2}$ differ from one another, so that the energy $E_{disc-caliper}$ udischarged from the brake disc to the brake caliper is different from the energy $E_{caliper-disc}$ discharged from the brake caliper to the brake disc, specifically even when the amount of the difference of the last-determined disc temperature $T_{disc, old}$ minus the last-determined caliper temperature $T_{caliper, old}$ is the same size.

The discharge of energy from the brake caliper to the vicinity $E_{caliper-vicinity}$ must also be taken into account in determining the current caliper temperature $T_{caliper, current}$. This discharge is determined as follows:

$$E_{caliper-vicinity} = T_{caliper, old} \cdot k_{caliper, 3}.$$

$k_{caliper, 3}$ is in this case a fifth factor which is likewise to be determined empirically.

From the energy balance of the energy supplied to the brake disc and the energy discharged by the disc, the current disc temperature $T_{disc, current}$ can then be determined as follows:

$$T_{disc, current} = T_{disc, old} + W_{disc}(E_{friction, disc} + E_{caliper-disc} - E_{disc-vicinity} - E_{disc-caliper}).$$

$W_{disc}$ is in this case a sixth factor which may be determined empirically or experimentally and depends, for example, on the heat storage capacity of the brake disc. In a similar way, the current caliper temperature $T_{caliper, current}$ of the brake caliper is obtained as $T_{caliper, current} = T_{caliper, old} + W_{caliper}(E_{disc-caliper} - E_{caliper-vicinity} - E_{caliper-disc})$, $W_{caliper}$ being a seventh factor which may be determined empirically or experimentally and depends, in particular, on the heat storage capacity of the brake caliper.

When the ignition is switched off, the calculation of the current disc temperature $T_{disc, current}$ and of the current caliper temperature $T_{caliper, current}$ is discontinued in order to avoid unnecessarily loading the vehicle battery. Thus, whenever the vehicle has been stopped, the temperature state of the wheel-braking device at the time of the preceding switch-off of the vehicle must also be taken into account.

Figure 3:
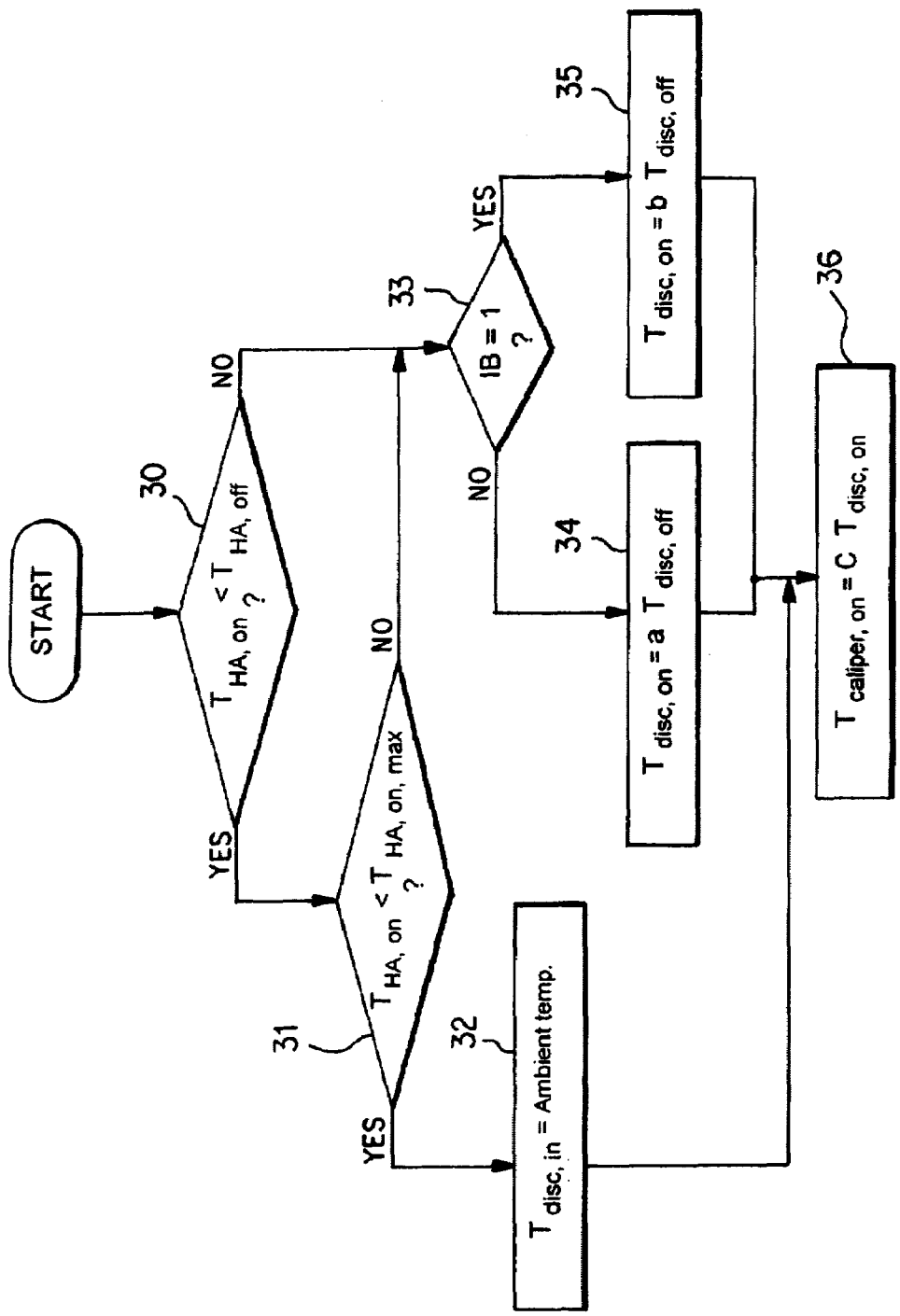

FIG. 3 illustrates, in the form of a flow chart, the initialization of the method according to the invention when the ignition is switched on.

Whenever the ignition is switched off, the last-determined disc temperature (disc switch-off temperature $T_{disc, off}$) and the switch-off temperature $T_{HA, off}$ of the hydraulic assembly 13 prevailing when the ignition is switched off, are stored. Furthermore, when the ignition is switched off, an interrogation takes place as to whether the disc temperature had exceeded a first disc-temperature limit value $T_{disc, lim, 1}$ (for example, 400° C.) since the last switch-on of the ignition. If not, an initialization bit is set at the value zero. When the disc temperature has exceeded the first limit value $T_{disc, lim, 1}$ at least once in the last operating phase of the vehicle, a second interrogation is carried out as to whether the disc switch-off temperature $T_{disc, off}$ is below a second disc-temperature limit value $T_{disc, lim, 2}$. If so, the initialization bit is likewise set at zero. If, however, the disc switch-off temperature $T_{disc,\,off}$ is above the second disc-temperature limit value $T_{disc,\,lim,\,2}$, the initialization bit is set at the value 1.

The second disc-temperature limit value $T_{disc,\,lim,\,2}$ is lower than the first disc-temperature limit value $T_{disc,\,lim,\,1}$ and, in the preferred exemplary embodiment, amounts to 300° C.

The values stored when the ignition is switched off serve, when the ignition is switched on, for determining the disc switch-on temperature $T_{disc,\,on}$ and the caliper switch-on temperature $T_{caliper,\,on}$ as initial values for the further cyclic calculation of the current disc temperature $T_{disc,\,current}$ and the current caliper temperature $T_{caliper,\,current}$.

As illustrated in FIG. 3, after the ignition is switched on (start), there is first an interrogation, in step 30, as to whether the currently prevailing switch-on temperature $T_{HA,\,on}$ of the hydraulic assembly 13 is lower than the switch-off temperature $T_{HA,\,off}$ of the hydraulic assembly 13 stored during the preceding switch-off of the ignition. If so, in step 31, it is determined whether the switch-on temperature $T_{HA,\,on}$ of the hydraulic assembly 13 is lower than a predeterminable maximum switch-on value $T_{HA,\,on,\,max}$ which, in a preferred exemplary embodiment, amounts to 47° C. If the interrogation in step 31 is in the affirmative, the disc switch-on temperature $T_{disc,\,on}$ is equated with the current ambient temperature of the vehicle (step 32).

In the preferred exemplary embodiment, the temperature of the hydraulic assembly 13 and the ambient temperature are measured in each case by means of sensor technology which is not illustrated in any more detail.

If either of the interrogations carried out in steps 30 and 31 is in the negative, there then follows, in step 33, a further interrogation as to whether the initialization bit IB during the preceding switch-off of the ignition was set at the value 1. If not, in step 34 the disc switch-on temperature $T_{disc,\,on}$ is determined by a multiplication of an experimentally determined constant a by the switch-off temperature of the brake disc $T_{disc,\,off}$ stored during the preceding switch-off of the ignition.

If it is established, in step 33, that the initialization bit IB has the value 1, the disc switch-on temperature $T_{disc,\,on}$ is obtained from a multiplication of an experimentally determined constant b by the disc switch-off temperature $T_{disc,\,off}$ stored during the preceding switch-off of the ignition (step 35).

The constants a and b are different from one another. In the exemplary embodiment, the constant a has the value ½ and the constant b has the value ¾.

Finally, in step 36, by means of the disc switch-on temperature $T_{disc,\,on}$ determined in step 32, 34 or 35, the caliper switch-on temperature $T_{caliper,\,on}$ is determined from a multiplication of an experimentally determined constant c by the previously determined disc switch-on temperature $T_{disc,\,on}$.

After the ignition has been switched on, the switch-on values for the disc temperature and the caliper temperature are available, so that the current disc temperature and the current caliper temperature can be determined when the vehicle continues in operation.

If the caliper temperature exceeds a predeterminable maximum value $T_{caliper,\,max}$, for example 180° C., the driver is warned via an acoustic and/or optical warning signal. The warning signal is cancelled again when the current caliper temperature $T_{caliper,\,current}$ has fallen below a cut-off value $T_{caliper,\,cut\text{-}off}$ which, in the preferred exemplary embodiment, amounts to 170° C.

The warning signal transmitted to the driver is also generated when the current disc temperature $T_{disc,\,current}$ exceeds a predeterminable maximum value $T_{disc,\,max}$ for a predeterminable time duration TD. In the exemplary embodiment, this maximum value $T_{disc,\,max}$ amounts to 600° C. and the time duration TD amounts to 5 minutes. If the current disc temperature $T_{disc,\,current}$ is above 600° C. for longer than 5 minutes, in the exemplary embodiment the warning signal is generated. The warning signal is cut off again when the current disc temperature $T_{disc,\,current}$ has fallen below a cut-off value $T_{disc,\,cut\text{-}off}$ for the disc temperature, which cut-off value is, for example, at 350° C.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for determining temperature of a wheel-braking device of a brake system in a vehicle, which braking device includes a brake disc and a brake caliper, said method comprising:
   determining current disc temperature ($T_{disc,\,current}$) of the brake disc as a function of a last-determined disc temperature ($T_{disc,\,old}$), energy ($E_{friction,\,disc}$) supplied to the brake disc since determination of the last-determined disc temperature, and energy ($E_{disc,\,dis}$) discharged by the brake disc since determination of said last-determined disc temperature; and
   determining current caliper temperature ($T_{caliper,\,current}$) of the brake caliper of the wheel-braking device as a function of the current disc temperature ($T_{disc,\,current}$) of the brake disc.

2. The method according to claim 1, wherein the energy ($E_{friction,\,disc}$) supplied to the brake disc is determined as a function of a set brake pressure (p) at the wheel-braking device.

3. The method according to claim 1, wherein the energy ($E_{friction,\,disc}$) supplied to the brake disc is determined as a function of wheel speed ($V_{wheel}$) of an assigned vehicle wheel or of vehicle speed ($V_{veh}$).

4. The method according to claim 1, wherein the energy ($E_{friction,\,disc}$) supplied to the brake disc is determined as a function of a first factor ($k_{disc,\,1}$) which is in turn dependent on currently set brake pressure (p) at the wheel-braking device.

5. The method according to claim 4, wherein the first factor ($k_{disc,\,1}$) depends on at least one of a last-determined disc temperature ($T_{disc,\,old}$) and a last-determined caliper temperature ($T_{caliper,\,old}$).

6. The method according to claim 1, wherein energy ($E_{disc,\,dis}$) discharged by the brake disc is determined from a sum of energy ($E_{disc\text{-}vicinity}$) discharged to ambient environment by the brake disc and energy ($E_{disc\text{-}caliper}$) discharged from the brake disc to the brake caliper.

7. The method according to claim 6, wherein only energy discharged by convection is taken into account in determining the energy ($E_{disc,\,dis}$) discharged by the brake disc.

8. The method according to claim 1, wherein current caliper temperature ($T_{caliper,\,current}$) is determined as a function of energy ($E_{caliper\text{-}vicinity}$) discharged to ambient environment by the brake caliper and one of energy ($E_{disc\text{-}caliper}$) supplied to the brake caliper by the brake disc and energy ($E_{caliper\text{-}disc}$) discharged from the brake caliper to the brake disc.

9. The method according to claim 8, wherein one of the energy ($E_{disc\text{-}caliper}$) discharged from the brake disc to the brake caliper and the energy ($E_{caliper\text{-}disc}$) discharged from the brake caliper to the brake disc is determined as a function of a temperature difference between last-determined disc temperature ($T_{disc,\ old}$) and last-determined caliper temperature ($T_{caliper,\ old}$).

10. The method according to claim 1, wherein a warning signal is transmitted to a driver of the vehicle when current disc temperature ($T_{disc,\ current}$) exceeds a predeterminable maximum value ($T_{disc,\ max}$), without interruption, for a predeterminable time duration ($T_D$).

11. The method according to claim 1, wherein a warning signal is transmitted to a driver of the vehicle when current caliper temperature ($T_{caliper,\ current}$) exceeds a predeterminable maximum value ($T_{caliper,\ max}$).

12. The method according to claim 1, wherein when an ignition of the vehicle is switched off, a disc switch-off temperature ($T_{disc,\ off}$) and a switch-off temperature ($T_{HA,\ off}$) of a hydraulic assembly of the brake system are stored.

13. The method according to claim 12, wherein when the ignition of the vehicle is switched on, a disc switch-on temperature ($T_{disc,\ on}$) is determined, which corresponds to ambient temperature if, when the ignition is switched on, a switch-on temperature ($T_{HA,\ on}$) of the hydraulic assembly is lower than the stored switch-off temperature ($T_{HA,\ off}$) of the hydraulic assembly and if the switch-on temperature ($T_{HA,\ on}$) of the hydraulic assembly is lower than a predeterminable maximum switch-on value ($T_{HA,\ on,\ max}$).

14. The method according to claim 12, wherein when the ignition of the vehicle is switched on, a disc switch-on temperature ($T_{disc,\ on}$) is determined as a function of the disc switch-off temperature ($T_{disc,\ off}$) if, when the ignition is switched on, a switch-on temperature ($T_{HA,\ on}$) of the hydraulic assembly is not lower than the stored switch-off temperature ($T_{HA,\ off}$) of the hydraulic assembly or if the switch-on temperature ($T_{HA,\ on}$) of the hydraulic assembly is not lower than a predeterminable maximum switch-on value ($T_{HA,\ on,\ max}$).

* * * * *